INVENTOR.
PAUL C. GOODMAN
MILFORD C. HORTON

Richard J. Seeger
ATTORNEY

INVENTOR.
PAUL C. GOODMAN
MILFORD C. HORTON
Richard J. Seeger
ATTORNEY

INVENTOR.
PAUL C. GOODMAN
MILFORD C. HORTON

Richard T. Seeger
ATTORNEY

INVENTOR.
PAUL C. GOODMAN
MILFORD C. HORTON
Richard J. Seeger
ATTORNEY

INVENTOR.
PAUL C. GOODMAN
MILFORD C. HORTON

Richard J. Seeger
ATTORNEY

Sept. 12, 1967 P. C. GOODMAN ET AL 3,341,789

LATCHING FERRITE CIRCULATOR HAVING THE FERRITE SYMMETRICALLY LOCATED WITH RESPECT TO EACH RF SIGNAL CARRYING ARM

Filed April 19, 1965 8 Sheets-Sheet 6

INVENTOR.
PAUL C. GOODMAN
MILFORD C. HORTON

Richard J. Seeger
ATTORNEY

INVENTOR.
PAUL C. GOODMAN
MILFORD C. HORTON

Richard T. Seeger
ATTORNEY

INVENTOR.
PAUL C. GOODMAN
MILFORD C. HORTON

Richard T. Seeger
ATTORNEY

United States Patent Office 3,341,789
Patented Sept. 12, 1967

3,341,789

LATCHING FERRITE CIRCULATOR HAVING THE FERRITE SYMMETRICALLY LOCATED WITH RESPECT TO EACH RF SIGNAL CARRYING ARM

Paul C. Goodman, Berkley, and Milford C. Horton, Birmingham, Mich., assignors to The Bendix Corporation, a corporation of Delaware Filed Apr. 19, 1965, Ser. No. 449,161
25 Claims. (Cl. 333—1.1)

This invention pertains to a fast switching device which latches or remains in each switched position once the switching has been completed and more particularly to a switch which utilizes a gyromagnetic material, such as ferrite, to cause a switching action from one R-F carrying member to another when the ferrite member is subject to a magnetizing field. The switched connection will be held by the remanent magnetic field in the ferrite even after the magnetizing field is removed and until a second magnetizing field in the opposite direction is applied to the ferrite. This is called a latching switch. The switch of this invention can be realized in stripline, waveguide, and coaxial transmission line forms.

In the preferred embodiment of this invention, the switching connections are utilized in a circulator which is a device having $n$ ports, where $n$ is three or more, with a signal entering one port going only to a second port, a signal entering a second port going only to a third port, etc., with the signal entering the $n$th port going to the first port. In such a device, a magnetic field is used in combination with a gyromagnetic material to provide the proper signal paths and these paths may be switched or reversed, i.e., the signal from the third port going only to the second port, the signal from the second port going only to the first port, etc., by reversing the magnetic field.

This invention provides a magnet source and ferrite which are entirely within the ground planes of the circulator and provides equal gyromagnetic effects on incoming signals from all branches of the circulator and with a magnet source circuit which has no air gaps, thereby greatly decreasing the switching time, increasing efficiency and decreasing size.

Therefore, it is an object of this invention to provide a non-reciprocal latching switch for three or more R-F carrying members, in a device such as a circulator, wherein the magnetic field for switching from one R-F carrying member to another is generated directly in the ferrite material itself which is disposed to apply gyromagnetic effects equally to all of the members, whereby the magnetizing flux path is entirely within the ferrite material thereby eliminating air gaps and does not pass through ground planes thereby eliminating resultant eddy currents, resulting in decreased switching time from 20 to 50 microseconds of prior art devices to less than 1 microsecond. Also, by this invention the external magnetizing yoke is unnecessary and therefore the amount of material to be magnetized is greatly reduced contributing to the above mentioned decrease in switching time and reduction in size.

It is an object of this invention to magnetize the ferrite material in the device described by forming holes in the ferrite material with the holes being placed in the ferrite to provide identical hole disposition to each of the R-F carrying members and with the holes being in the plane of the junction formed by the R-F signal carrying members. A conductor for carrying a D.C. magnetizing current is connected through the holes and by sending a D.C. current pulse through this conductor a circulator connection is effected from one R-F signal carrying member to another. Reversing the D.C. magnetizing current reverses the connections.

It is an object of this invention to magnetize in the structure of the first object a toroid having a central opening of ferrite material by wrapping a helical winding about the toroid and through the opening for carrying the D.C. magnetizing pulse. The toroid would be in the plane of the junction of the R-F signal carrying members.

It is an object of this invention to use the same conductor to carry both the D.C. current pulse and the R-F signal from one member to another. This is accomplished by capacitive coupling of the conductor to the R-F signal carrying members so that the D.C. current is isolated from the R-F signal.

It is an object of this invention to use a switch as above described with a plurality of stripline R-F signal carrying members with a stripline ring encircling the ferrite member between two ground planes and with the holes of the ferrite member being in the plane of the ring.

It is an object to use a plurality of ferrite members to improve coupling efficiency and reduce weight in applications such as stripline and waveguide switches.

These and other objects and advantages will become more apparent when preferred embodiments are considered with the drawings in which.

Figure 5:
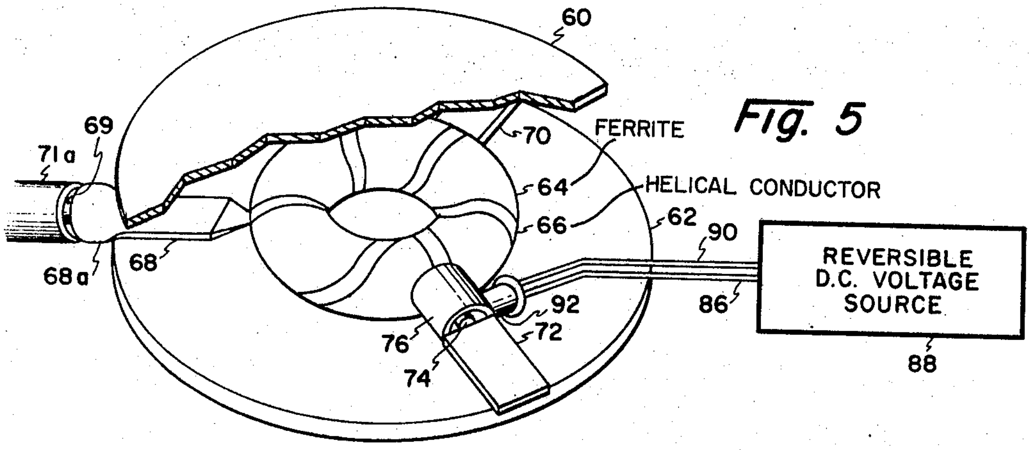
FIGURE 5 is a view in perspective, partially broken away, showing a stripline circulator having a toroidal ferrite block.
Figures 5A, 6, 6A:
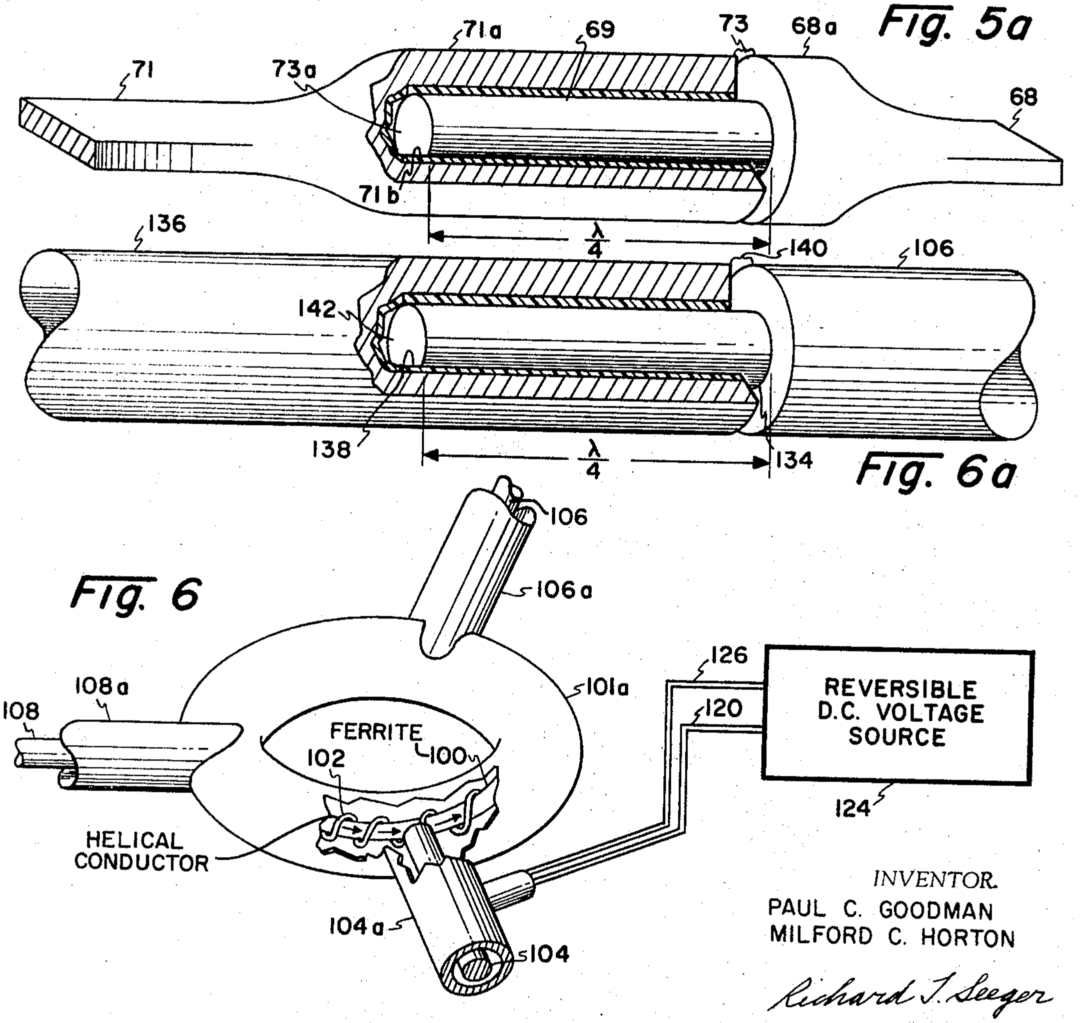
Figure 5B:
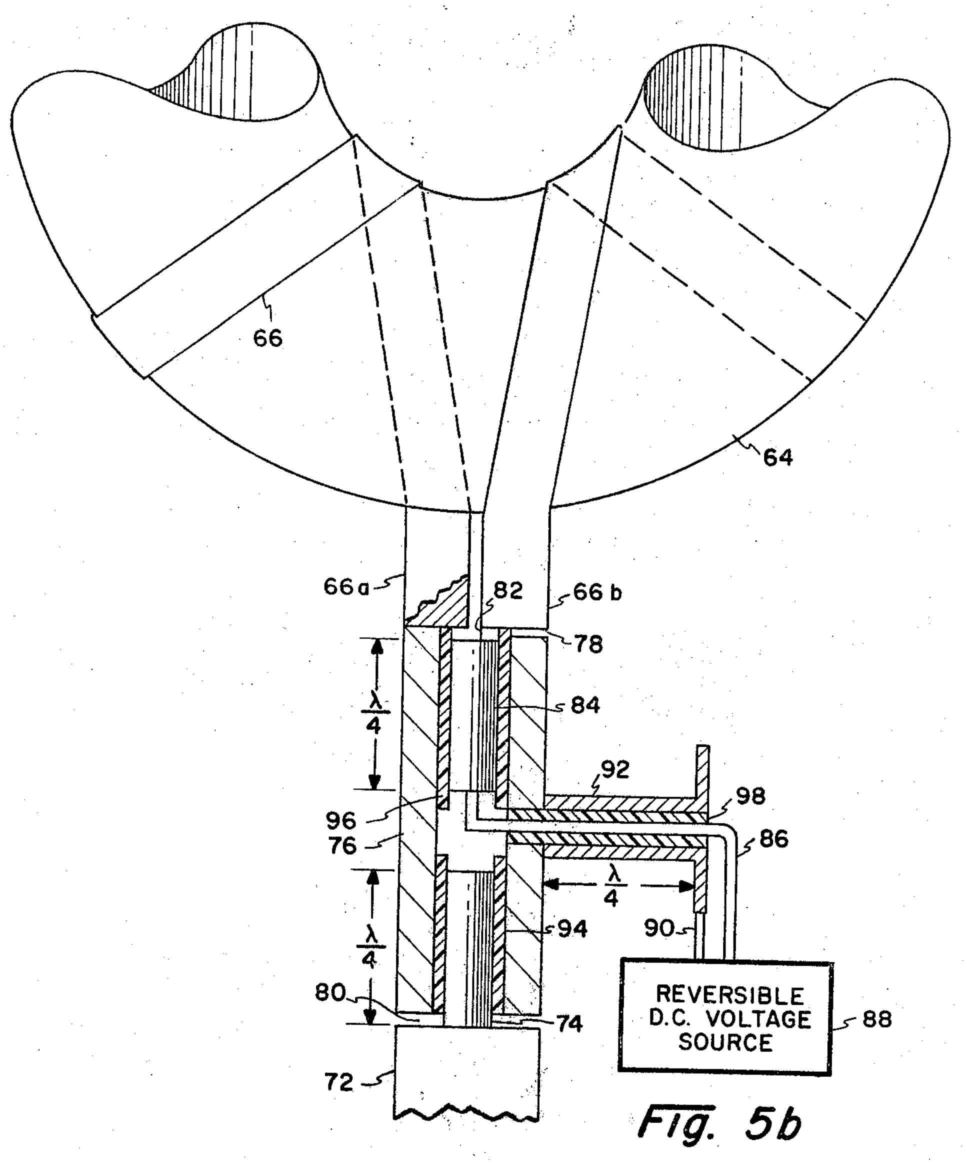
Figure 6B:
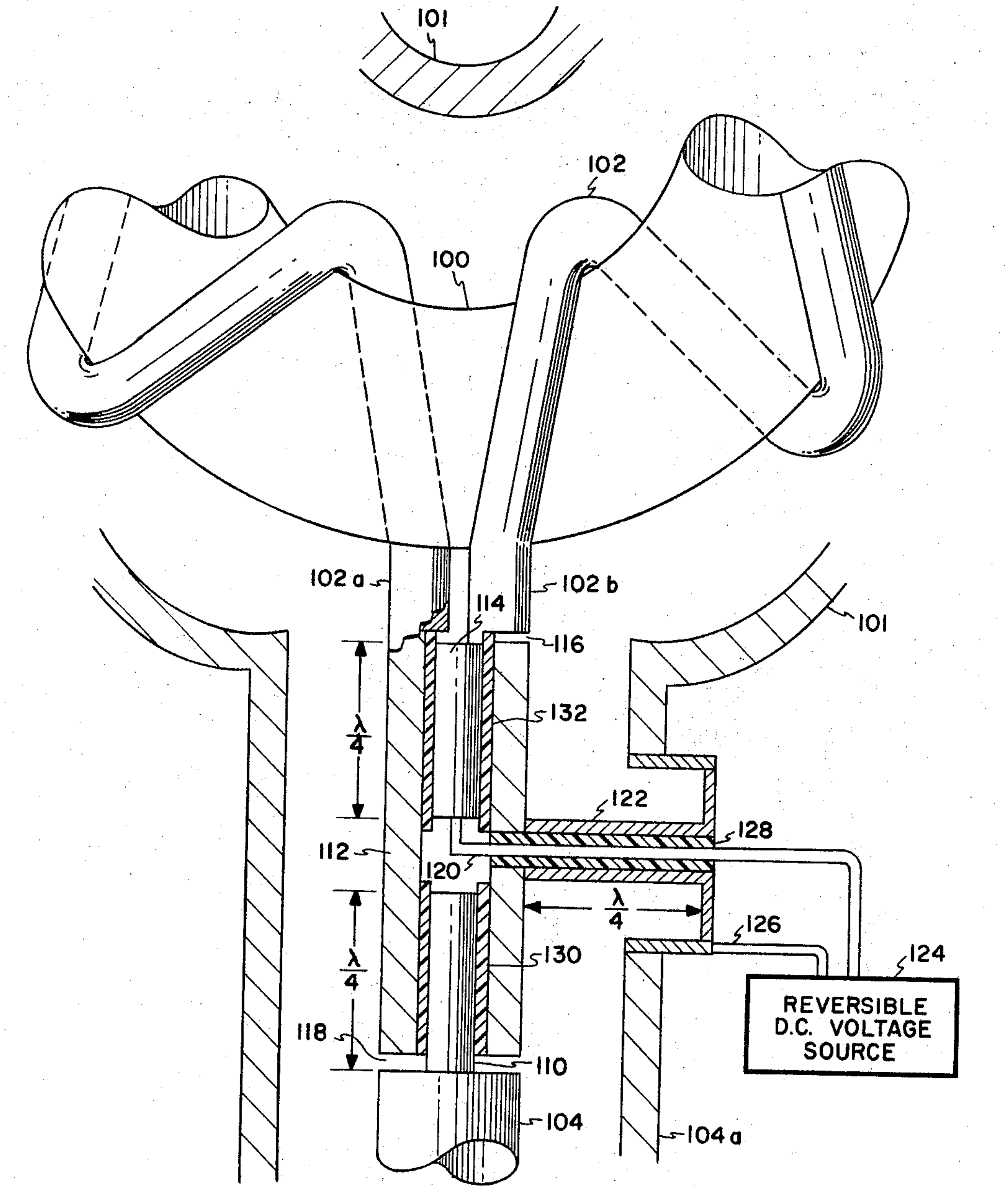
Figure 7:
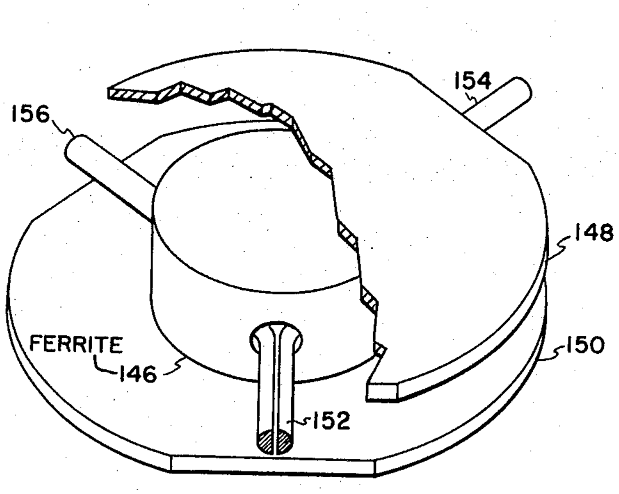
Figures 8, 9:
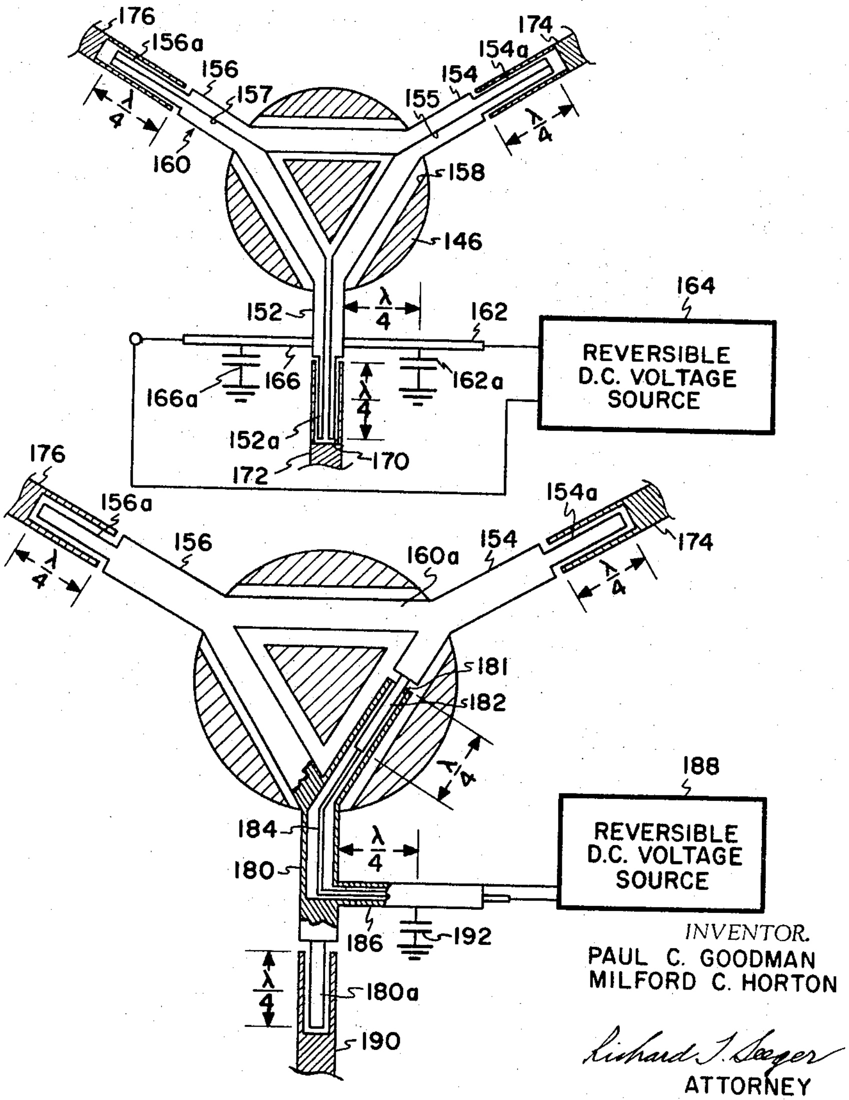
Figure 10:
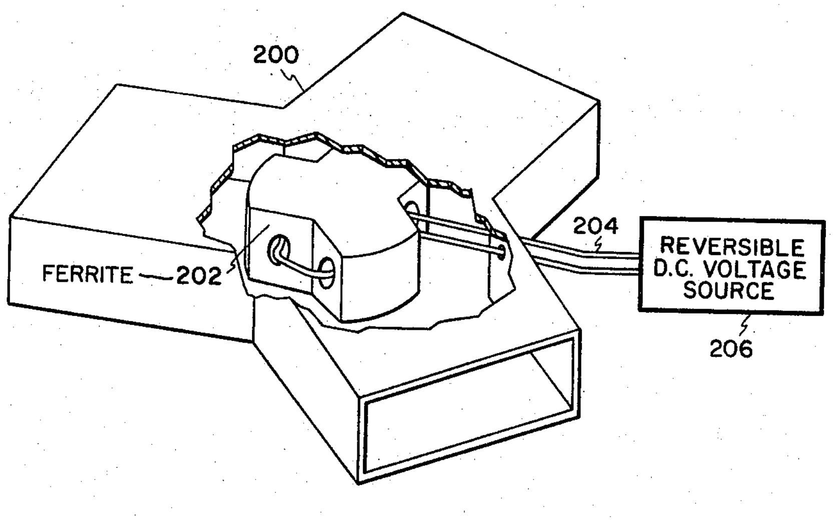
Figure 11:
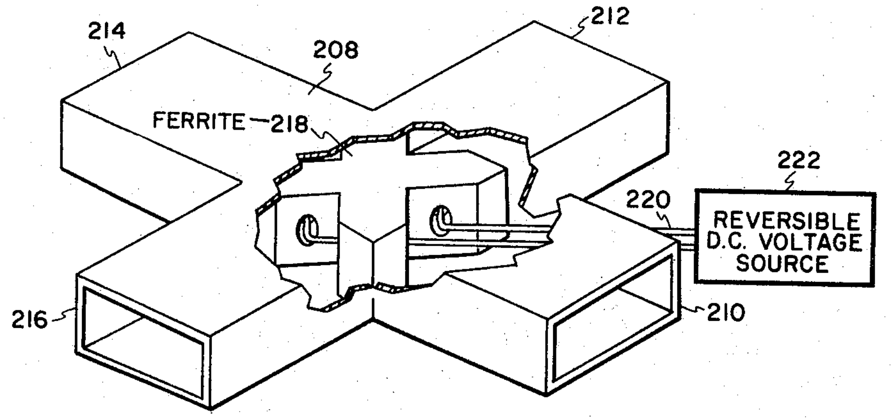
Figure 12:
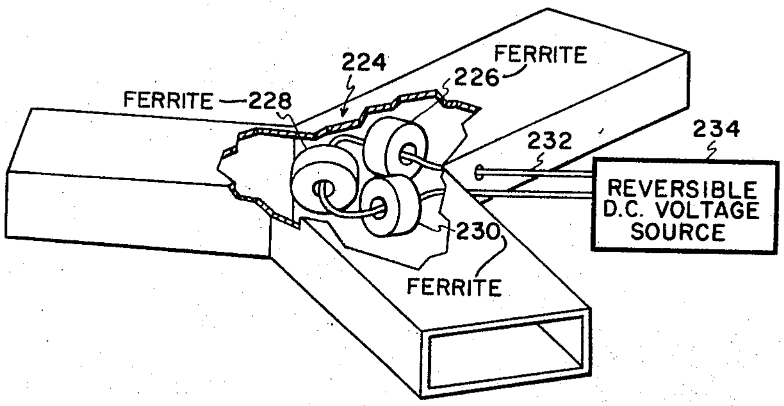
Figure 13:
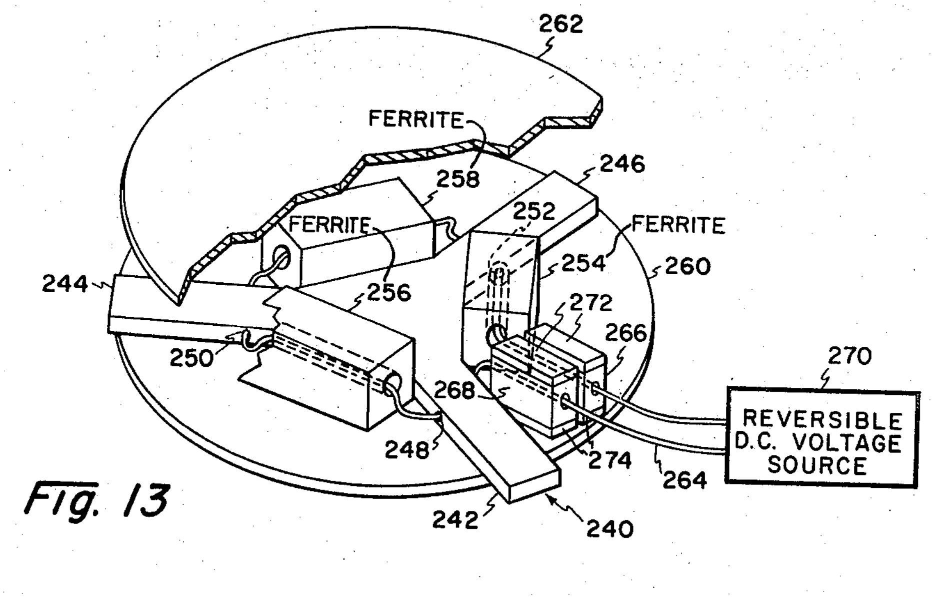
Figure 13A:
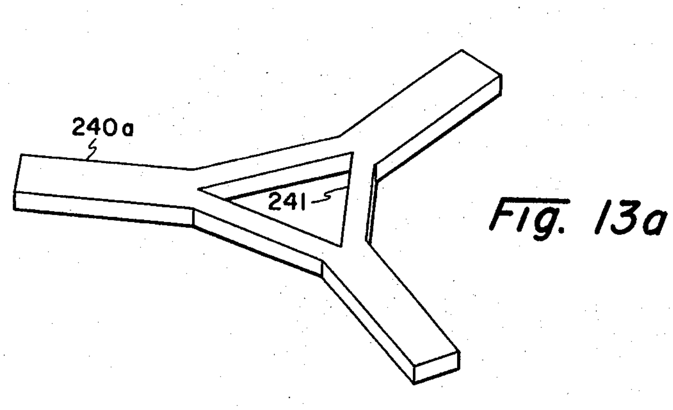
Figure 14:
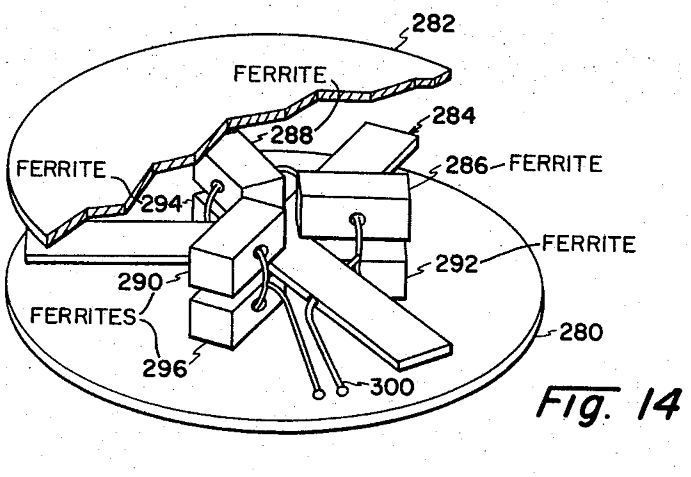
Figure 14A:
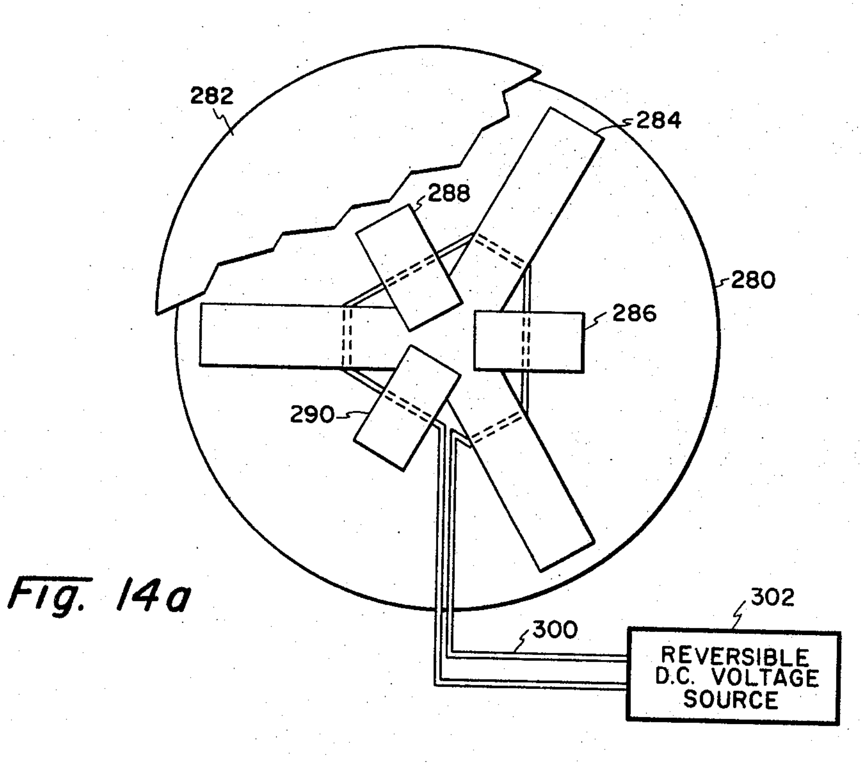

FIGURE 5*a* is a greatly enlarged perspective view of the manner in which two of the stripline arms in FIGURE 5 are connected to external circuitry;

FIGURE 5*b* is a greatly enlarged partial plan view, partially in section, of the structure for separating the D.C. magnetizing current from the R-F energy in the helical winding about the toroid of FIGURE 5;

FIGURE 6 is a perspective view, partially broken away, of a coaxial circulator having a toroidal ferrite member;

FIGURE 6*a* shows a greatly enlarged perspective view of the structure for connecting the center conductors of two of the arms of FIGURE 6 to external circuitry;

FIGURE 6*b* is a greatly enlarged view of the structure for separating the D.C. magnetizing current from the R-F current in the coaxial lines in the helical winding about the toroid of FIGURE 6;

FIGURE 7 is a perspective view, partially broken away, of a flat plate coaxial circulator;

FIGURE 8 is a section through the ferrite block of FIGURE 7 showing one method of separating the D.C. magnetizing current from the R-F energy carried in the common delta shaped conductor;

FIGURE 9 is a section through the ferrite block of FIGURE 7 showing a second manner of isolating the D.C. magnetizing current from the R-F energy in the common delta shaped conductor;

FIGURE 10 is a perspective view, partially broken away, of a 3-port waveguide having a Y-shaped ferrite member;

FIGURE 11 is a 4-port waveguide having a cross shaped ferrite member;

FIGURE 12 is a 3-port waveguide showing three separate toroidal ferrite members, one in each arm of the waveguide;

FIGURE 13 is a view in perspective, partially broken away, of a Y-shaped stripline member and three ferrite blocks between the ground planes;

FIGURE 13*a* is a plan view of a Y-shaped stripline member which may be used in the embodiment of FIGURE 13;

FIGURE 14 is a view in perspective, partially broken away, of a Y-shaped stripline circulator having ferrite blocks arranged above and below the stripline member and between the arms of the stripline member; and FIGURE 14*a* is a plan view, partially broken away, of the embodiment of FIGURE 14.

Figure 1:
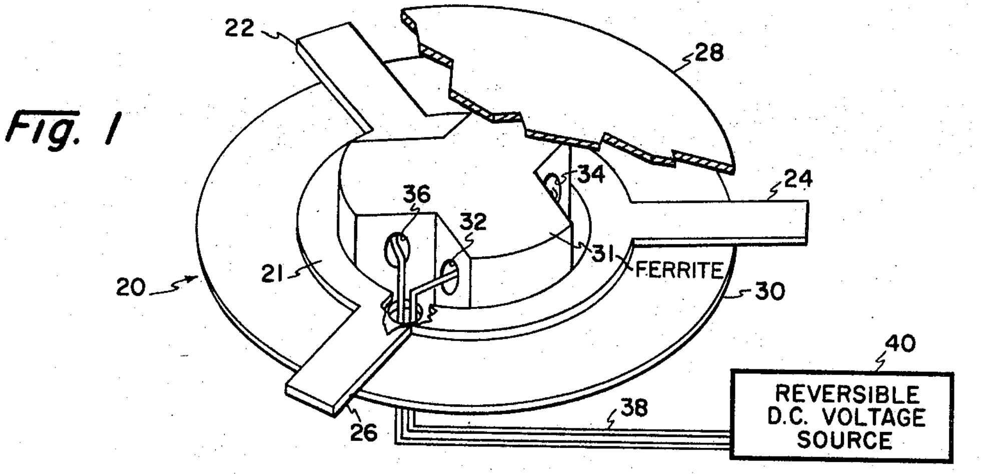
FIGURE 1 is a view in perspective, partially broken away, of a stripline switch having a block of ferrite material.
Figure 2:
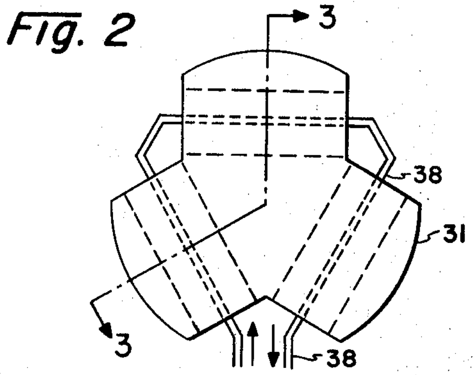
FIGURE 2 is a plan view of the block of ferrite material and the D.C. magnetizing current carrying wire.

*The embodiment of FIGURES 1 and 2*

Figure 3:
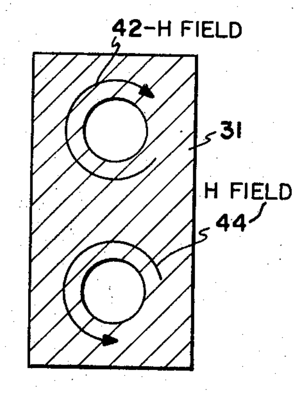
FIGURE 3 is a section taken at 3—3 of FIGURE 2 showing the direction of the magnetic field in the ferrite block.

In FIGURE 1 a circulator 20 has a stripline member with hub 21 and arms 22, 24 and 26 extending from hub 21 for connection to external circuitry, not shown. Hub 21 is located between a pair of ground planes 28 and 30. Located within hub 21 of the circulator 20 is a Y-shaped block 31 of gyromagnetic material, such as ferrite, having holes 32, 34 and 36 respectively in the arms thereof. The holes 32, 34, 36 are placed so that each arm 22, 24, 26 sees exactly the same pattern of hole arrangement; e.g., arm 26 is spaced from and is angularly related to holes 36 and 32 in exactly the same manner that arm 24 is spaced from and angularly related to holes 31 and 34 to provide a "symmetrical" relationship between the holes and the arms to insure symmetrical or equal gyromagnetic effect on the signals in the arms resulting in improved circulator characteristics. The legs of the Y-shaped member 31 extend between and are symmetrical to arms 22, 24 and 26, respectively. The holes 32, 34 and 36 are parallel to the plane of the stripline junction hub 21 and a D.C. winding 38 is connected to a reversible D.C. voltage source 40 and passes through each of the holes 32, 34 and 36 and returns to voltage source 40. Winding 38 is also in a plane parallel to hub 21. The purpose of D.C. winding 38 is to carry a D.C. current to magnetize the ferrite material in block 31 to cause a circulator action between arms 22, 24 and 26. In the first mode of circulator action, the energy from arms is reversed so that the energy from arm 24 can 26 can only pass to arm 22 and the energy from arm 22 can only pass to arm 24. In the second mode of circulator action the direction of energy flow between the arms is reversed so that the energy from arm 24 can pass only to arm 22, the energy from arm 22 can pass only to arm 26, and the energy from arm 26 can pass only to arm 24. The circulator action can be switched from the first mode to the second mode by reversing the direction of current in winding 38. FIGURE 3 shows the direction of the magnetic field for one direction of current through winding 38 and the arrows in FIGURE 3 would be reversed in direction for a reversed direction of current in line 38.

The purpose of having winding 38 in a plane parallel to strip member 20 is to effect isolation between the D.C. current in winding 38 and the R-F signals in the strip member 21.

Only a pulse of current is necessary from source 40 to switch the magnetic field in ferrite block 31 and the remanent field in the block is sufficient to maintain circulator action until a reverse pulse is received from source 40 to reverse the magnetic field. Hence, a switch may be made from one circulator mode to the other by sending a pulse of current through winding 38 which is of the proper polarity.

In previous circulators of this kind, a magnetic field would be established in the ferrite block 31 by external magnet means which required a large magnet on either side of ground planes 28 and 30. The external magnetic field of necessity passed through ground planes 28 and

30, thereby setting up eddy currents in the ground planes which tended to oppose and weaken the flux in the magnetic circuit. Also the magnetic field passed through air gaps which would inevitably exist in the magnetic circuit, further reducing and weakening the magnetic flux. Further, the magnet mass exterior of the ground planes required substantial additional magnetizing power thereby not only increasing the size of the circulator but also decreasing the speed with which the circulator could be switched from one mode to another.

As is evident from FIGURE 1, the flux path indicated by lines 42 and 44 in FIGURE 3 is wholly within the ferrite material 30 with no ground planes or air gaps to cross. Also the volume of material to be magnetized is much less so that switching times have been decreased from the 25 to 50 microseconds of conventional circulators to less than 1 microsecond with the circulators of this invention.

Figure 4:
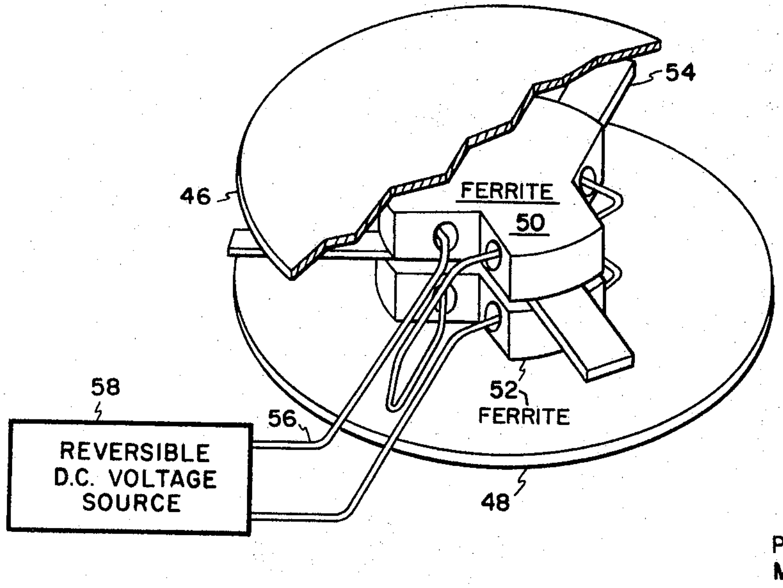
FIGURE 4 is a view in perspective, partially broken away, of a stripline circulator having two ferrite blocks.

*Embodiment of FIGURE 4*

A second embodiment is shown in FIGURE 4 wherein there is located between ground planes 46, 48 two Y-shaped blocks 50, 52, each similar to block 31 in FIGURE 1, which are placed above and below a Y-shaped stripline member 54. The legs of blocks 50, 52 are shown aligned with the arms of stripline member 54 but could be rotated 60° so as to be between the arms of stripline member 54. Also, the center section of each block 50, 52 could be removed to reduce the bulk of ferrite material to improve circulator action. A single continuous D.C. magnetizing winding 56, which is energized by reversible voltage source 58, passes through the holes in ferrite blocks 50 and 52 in the manner shown to establish similar magnetic fields in blocks 50 and 52. A pulse of current in winding 56 which is opposite in direction to the pulse creating the existing magnetic field will cause the magnetic flux paths in blocks 50 and 52 to reverse resulting in a switching of the currents in the arms of stripline member 54 as explained for the embodiment shown in FIGURES 1–3.

*Embodiment of FIGURE 5*

The embodiment of this invention shown in FIGURE 5 has between ground planes 60 and 62 a toroidal ferrite member 64 having an opening centrally thereof and a helical flat winding 66 therearound. Connected to winding 66 as by soldering are stripline arms 68, 70 while stripline arm 72 is connected as shown in FIGURE 5*b*. The special couplings shown in FIGURES 5*a* and 5*b* enable winding 66 to be used for two purposes: one purpose is to carry the D.C. magnetizing current and the other purpose is to carry the R-F signal between the arms 68, 70 and 72. Since it is necessary to isolate the D.C. current from the external circuitry which is connected to arms 68, 70 and 72, the following structure shown in FIGURE 5*b* is employed.

Flat stripline arm 72 has a circular pin 74 connected to and extending from the end thereof. Pin 74 is inserted in one end of sleeve 76 which is connected at the other end to a portion **66*a* of winding 66. Cylinder 76 is separated from portion 66*b* of winding 66 by air gap 78 and cylinder 76 is separated from arm 72 by air gap 80. Portion 66*b* is connected by wire 82 to pin 84 and since pins 74 and 84 are $\lambda/4$ inches long, where $\lambda$ is the wavelength in inches of the center frequency for which the circulator is designed, R-F signals pass across gaps 78 and 80 with a minimum of signal loss or distortion thereby establishing R-F communication between arm 72 and winding 66. Air gap 80 prevents D.C. from passing to arm 72.**

Pins 74, 84 are insulated from cylinder 76 by means of plastic sleeves 94 and 96, respectively. Wire 86 is insulated from shield housing 92 by plastic sleeve 98.

Coming out of pin 84 is wire 86 which is connected to one terminal of reversible D.C. voltage source 88 which has a second terminal connected by wire 90 to cylinder 76 through cylindrical shield member 92 which is placed about wire 86 and is also λ/4 inches long. This provides a D.C. path through winding 66. The D.C. signal is isolated from the R-F signal in arms 68, 70 by use of the structure in FIGURE 5*a*.

Each of stripline arms 68, 70 are coupled to external circuits as shown in the enlarged FIGURE 5*a*. For example, arm 68 is formed into a circular cross section portion 68*a* from which a pin 69 extends. The external circuit stripline member 71 is also formed into a circular cross section 71*a* and has a bore 71*b* formed therein into which the pin 69 is inserted with an insulating sleeve therearound. Air gap 73 exists between circular portions 68*a* and 71*a* and air gap 73*a* exists between the end of pin 69 and the end of bore 71*b*. Pin 69 is λ/4 inches long, and with this geometry the R-F signal can pass from arm 68 to line 71 with minimum loss and distortion while the D.C. magnetizing signal is isolated from the external circuit 71.

*Embodiment of FIGURE 6*

The embodiment of FIGURE 6 is similar to that shown in FIGURE 5 in that the ferrite member 100 is toroidal in shape. Helical winding 102 carries the D.C. magnetizing current around toroid 100 and also carries the R-F signal from the external circuits between arms 104, 106 and 108. A coaxial outer conductor 104*a*, 106*a* and 108*a* is placed about arms 104, 106 and 108 while coaxial outer conductor 101*a* is placed about ferrite toroid 100. Arms 106 and 108 are directly connected to helical winding 102 while arm 104 is connected to winding 102 in the manner shown in the enlarged view of FIGURE 6*b*. Arm 104 has extended therefrom a pin 110 which is inserted in one end of cylindrical sleeve 112. Sleeve 112 at its other end is connected to portion 102*a* of winding 102 while portion 102*b* of winding 102 is connected to pin 114. Pins 110 and 114 are λ/4 inches long and air gaps 116 and 118 exist respectively between portion 102*b* and the top end of sleeve 112 and conductor 104 and the bottom end of sleeve 112. With this geometry, R-F signals can pass with minimum loss and distortion between conductor 104 and sleeve 112, while D.C. signals are prevented from passing therebetween.

A wire 120 with shield 122 is connected to the lower end of pin 114 to one terminal of reversible D.C. current source 124. The other terminal of source 124 is connected by means of wire 126 and shield 122 to sleeve 112. This provides a D.C. current path around helical winding 102 which current path is isolated from conductor 104. The length of shield 122 is λ/4 inches long and conductor 120 is insulated from shield 122 by plastic sleeve 128. Pins 110 and 114 are insulated from sleeve 112 by plastic sleeves 130, 132 respectively.

A D.C. current flow in helical winding 102 is isolated from the external circuitry connected to conductors 106 and 108 by means of structure shown in FIGURE 6*a*. In FIGURE 6*a* arm 106 has a pin 134 connected thereto and extending therefrom while the external circuitry conductor 136 has a socket 138 formed in the end into which pin 134 is inserted with an insulating sleeve therebetween. Air gaps 140 and 142 separate conductor 136 from arm 106 and the end of pin 134 respectively. Pin 134 is λ/4 inches long. With this geometry, R-F signals can pass from arm 106 to conductor 136 with minimum loss and distortion while D.C. current in arm 106 is isolated from external conductor 136. Outer conductors 104*a*, 106*a* and 108*a* extend to shield the external circuitry conductors.

*Embodiments of FIGURES 7, 8 and 9*

In FIGURE 7 is shown a flat plate coaxial circulator which has a ferrite block 146 placed between ground planes 148 and 150. Round conductor arms 152, 154 and 156 are equally spaced about block 146 and extend from delta shaped conductor 160 for connection to external circuitry. Arms 154 and 156 are divided along lines of contact 155 and 157 respectively for easy assembly into ferrite block 146. Block 146 has a delta shaped groove 158 formed therein and placed in groove 158 in the delta shaped conductor 160 which carries both the D.C. magnetizing current for block 146 and also carries the R-F signal between arms 152, 154 and 156.

FIGURE 8 shows one manner of isolating the D.C. current from the external circuitry for the embodiment of FIGURE 7. Arm 152 of member 160 is split into two sections insulated from one another, with one section being connected to conductor 162 which leads to one terminal of reversible D.C. voltage source 164 and the other section being connected to conductor 166 which leads to a second terminal of source 164. Capacitances 162*a* and 166*a* are placed respectively between conductors 162 and 166 at a distance of λ/4 inches from conductor 152 to short to ground any R-F signal in conductors 162 and 166. The end 152*a* of portion 152 is reduced slightly in diameter and is inserted in but insulated from socket 170 in the end of external circuit conductor 172. The length of end 152*a* is λ/4 inches.

In similar fashion the ends 156*a* and 154*a* are reduced slightly in diameter and are inserted in but insulated from socket portions of conductors 176 and 174. The lengths of the reduced diameter ends of portions 156*a* and 154*a* are also λ/4 inches, and transmission of R-F signal between conductors 154 and 156 to external conductors 174 and 176 occurs with minimum signal distortion or attenuation.

FIGURE 9 shows a second manner of isolating the D.C. magnetizing pulse signals from the R-F lines. Arms 154 and 156 of a delta shaped member 160*a* are provided with reduced diameter ends 154*a* and 156*a* of λ/4 inches in length which fit into and are insulated from socket portions of external conductors 174 and 176 in a manner similar to that for the embodiment of FIGURE 8. A leg of the delta shaped member 160*a* has a socket portion 181 for receiving pin 182 and wire 184 which are insulated from socket 181, with wire 184 extending through and being insulated from a tubular branch 186 of arm 180. Tubular branch 186 is connected to one terminal of a reversible D.C. voltage source 188 while the center conductor 184 is connected to the second terminal of source 188. In this manner a closed circuit is provided around delta member 160*a* for the D.C. magnetizing pulses which are at the same time isolated from arms 174, 176 and 190. Pin 182 is λ/4 inches long and a capacitance 192 is placed λ/4 inches from conductor 180 between shield branch 186 and ground to pass to ground the R-F signals before they reach source 188. Pin 180*a* is also λ/4 inches long and is inserted into but insulated from the socket in conductor 190.

This embodiment operates similarly to all of the other embodiments with circulator action in one mode switchable to circulator action to the opposite mode by sending a reverse pulse of D.C. current through delta members 160 or 160*a*.

*Embodiment of FIGURE 10*

This embodiment relates to a 3-port waveguide 200 having positioned therein a Y-shaped ferrite block 202 with the ends of the arms of block 202 being rounded, and which is otherwise similar in configuration to the block shown in FIGURES 2 and 3. A conductor 204 is passed from reversible D.C. voltage source 206 through the holes in ferrite block 202 and back again to a second terminal of source 206. Pulsing conductor 204 with a current pulse of one polarity will establish one circulator mode of operation in the ports of waveguide 200 while pulsing conductor 204 with a pulse of opposite polarity will switch the circulator mode of operation in the ports of waveguide 200 in the manner described for the embodiment of FIGURE 1.

*Embodiment of FIGURE 11*

In FIGURE 11 is shown a 4-port waveguide 208 having arms 210, 212, 214 and 216 which carry R-F signals, with a cross shaped ferrite block 218 having four arms with tapered ends and each of which has a hole bored in the plane of waveguide 208. A D.C. winding 220 is connected to one terminal of reversible D.C. voltage source 222 and passes through each of the holes of the arms of ferrite block 218 and returns to the second terminal of source 222. By pulsing winding 220 with a D.C. pulse of one polarity, signals will pass through the circulator in a right hand circulator mode, that is from arm 210 to arm 212, from arm 212 to arm 214, from arm 214 to arm 216, and from arm 216 to arm 210. By reversing the polarity of the pulse in winding 220, signals will travel through circulator 208 in a left hand circulator mode.

*Embodiment of FIGURE 12*

In FIGURE 12 is shown a 3-port waveguide 224 having three separate toroids 226, 228 and 230, one in each arm of the waveguide, and with the holes of the toroids being in the plane of the waveguide. The toroids are supported in the waveguide arms in the same manner that blocks 202 and 218 are supported, that being by friction fit with top and bottom walls of the arms. A D.C. winding 232 is connected to one terminal of reversible D.C. voltage source 234, passes through each of the holes of the toroids and returns to a second terminal of voltage source 234.

A D.C. voltage pulse of one polarity will cause right hand circulation in circulator 224 while a D.C. pulse of opposite polarity will cause left hand circulation in circulator 224.

In all of the embodiments in FIGURES 10–12, by placing the holes in the ferrite such that the D.C. magnetizing windings 204, 220 and 232, are in the plane of the waveguide, minimum interference is obtained between the D.C. pulse and the R-F signals in the waveguide.

*Embodiment of FIGURE 13*

Shown in FIGURE 13 is a Y-shaped stripline member 240 having legs 242, 244 and 246 each of which have holes 248, 250 and 252 respectively formed therein near the center of the stripline member 240. Ferrite blocks 254, 256 and 258 are placed between ground planes 260, 262 and each have holes formed longitudinally therein. A D.C. winding 264 passes through hole 248, block 256, hole 250, block 258, hole 252, and block 254 to carry magnetizing D.C. pulses to the ferrite blocks 254, 256 and 258 to magnetize them and establish a circulator mode as described for the previous embodiments. As in all the previous embodiments, the D.C. pulse is reversible to reverse the circulator mode. Also, as in all the previous embodiments, the remanent field of the circulator "latches" the circulator into one mode or the other after the D.C. pulse has been applied and the mode remains until a D.C. pulse is applied in the opposite direction.

Winding 264 is connected through low impedance blocks 266, 268 to reversible D.C. source 270. Blocks 266 and 268 are spaced from ground planes 260, 262 by dielectric spacers 272, 274 to provide a capacitive coupling with the ground planes to pass any high frequency signal that exist in winding 264 to ground. With the embodiment of FIGURE 13, closer coupling of the magnetic fields of the arms 242, 244 and 246 and blocks 254, 256 and 258 is possible.

In FIGURE 13*a* is shown an alternative stripline member **240*a* which has an opening 241 formed centrally thereof. Stripline member 240*a* may be used in place of member 240 where its preferred characteristics of further increased coupling between the stripline member 240*a*** and the ferrite blocks are desired.

*Embodiment of FIGURE 14*

FIGURES 14 and 14*a* show still another preferred embodiment of this invention having ground planes 280 and 282 with a Y-shaped stripline 284 being suspended therebetween and electrically insulated therefrom. Ferrite blocks 286, 288 and 290 are above stripline member 284 and extend radially from the center of strip member 284 on lines which bisect the angles between the equispaced arms of strip member 284. Ferrite blocks 292, 294 and 296 are positioned similarly to blocks 286, 288 and 290 but instead of being above strip member 284 they are positioned below strip member 284. Each of the ferrite blocks has a transverse hole therein and each of the arms of strip member 284 has a transverse hole formed therein. Line 300 from reversible D.C. voltage source 302 is divided with one portion of line 300 from reversible D.C. voltage source 302 passes through the transverse holes in the arms of strip member 284 and through the holes in upper blocks 286, 288 and 290 and through the transverse holes of the lower ferrite blocks 292, 294 and 296. Line 300, as shown in FIGURE 14, is divided in the area of the ferrite blocks with one portion of line 300 entering the upper block and the other portion of line 300 entering the lower block. The portions of line 300 recombine after passing through each set of upper and lower ferrite blocks and the recombined line passes through the hole in the next stripline arm after which it again divides to enter the next set of ferrite blocks and so on. In this manner the ferrite blocks all receive the same magnetizing current at the same time and are positioned so that their fields act effectively with the fields in the arm 284 to provide efficient switching action.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. Apparatus comprising
at least three R-F signal carrying members each having an electro-magnetic field in the space adjacent thereto when a signal is flowing therethrough,
ferrimagnetic means being in the electromagnetic field of each of said signal carrying members,
ground plane means being positioned externally of said ferrimagnetic means,
said ferrimagnetic means when magnetized producing interacting field lines which interact with said fields of said signal carrying members so that each signal carrying member passes it signal only to one signal carrying member and receives only the signal being carried by another signal carrying member,
said ferrimagnetic means having a hole formation therein for receiving conductor means carrying a direct current signal for generating a magnetic field directly within said ferrimagnetic means to place said ferrimagnetic means in a state of magnetization whereby said magnetic field has an unbroken path thereby eliminating air gaps in the magnetic path and eddy currents in said ground plane means,
said ferrimagnetic means having substantially the same configuration and disposition relative to each R-F signal carrying member so that each of the arms has ferrimagnetic material positioned relative thereto in the same way as every other arm, thereby improving electrical characteristics.

2. Apparatus comprising
at least three R-F signal carrying members each having an electromagnetic field associated therewith when a signal is flowing therethrough,
ferrite means capable of being magnetized in either of two states and being in the field of each of said signal carrying members, ground plane means being positioned externally of said ferrite means, said ferrite means capable of one stage of magnetization producing interacting field lines which interact with said electromagnetic fields of said signal carrying members so that each signal carrying member passes its signal only to a first signal carrying member and receives only the signal being carried by a second signal carrying member, said ferrite means capable of another state of magnetization for producing oppositely directed interacting field lines so that said each signal carrying member passes its signal only to said second signal carrying member and receives only the signal being carried by said first signal carrying member, said ferrite means having substantially the same configuration and disposition relative to each R-F signal carrying means so that said ferrite means corresponds in external configuration to the R-F signal carrying members in the area of said ferrite means, said ferrite means having a hole formation therein for receiving conductor means carrying a direct current signal in one direction to generate a magnetic field in one direction directly within said ferrite means and place said ferrite means in one of said states of magnetization and a direct current signal in the opposite direction to said one direction in said ferrite means and place said ferrite means in the second state of magnetization, so that the magnetic fields in said one direction and said opposite direction have unbroken paths thereby eliminating any air gaps in the magnetic paths and eddy currents in said ground plane means.

3. Apparatus comprising at least three R-F signal carrying members with said members being connected to a junction area and with said members extending from said junction area along axes which are equally spaced from each other and each member having an electromagnetic field in the space adjacent thereto when a signal is flowing therethrough, ferrite means being in the electromagnetic field of each of said signal carrying members, ground plane means being positioned externally of said ferrite means, said ferrite means when magnetized producing interacting field lines which interact with said fields of said signal carrying members so that each signal carrying member passes its signal only to one signal carrying member and receives only the signal being carried by another signal carrying member, said ferrite means having a hole formation therein for receiving conductor means carrying a direct current signal for generating a magnetic field directly within said ferrite means to place said ferrite means in a state of magnetization whereby said magnetic field has an unbroken path thereby eliminating air gaps in the magnetic path and minimizing eddy currents in said ground plane means, said ferrite means having a configuration and disposition relative to each R-F signal carrying member so that each of the arms has ferrite material positioned relative thereto in the same way as every other arm, thereby improving electrical characteristics, said ferrite means hole formation providing substantially identical hole disposition to each of said R-F signal carrying members so that each member has a hole positioned relative thereto in substantially identically the same way as every other member.

4. The apparatus of claim 3 with said R-F signal carrying members being embedded in said ferrite means.

5. The apparatus of claim 3 with means to isolate the D.C. magnetization pulses from the R-F signal in the R-F signal carrying members.

6. The apparatus of claim 3 with said R-F signal carrying members each comprising a stripline, said striplines being coplanar and connected at a common center, said ferrite means comprising ferrite blocks placed on either side of said connected striplines at said common center, the holes in said ferrite blocks being in planes substantially parallel to the plane of said striplines.

7. The apparatus of claim 3 with said R-F signal carrying members defining an opening at a central junction place, said ferrite means being positioned within said opening.

8. The apparatus of claim 3 with said ferrite means comprising ferrite blocks placed on opposite sides of said R-F signal carrying members.

9. The apparatus of claim 3 with said ferrite means comprising ferrite blocks positioned between said R-F signal carrying members.

10. The apparatus of claim 3 with said ferrite means comprising a toroid of ferrite material located centrally of said R-F signal carrying members.

11. The apparatus of claim 3 with said R-F signal carrying members each comprising a stripline arm, said striplines being coplanar and connected at a common center, said ferrite means comprising ferrite blocks positioned between said arms adjacent said common center, each of said ferrite blocks having a hole therein, holes in said ferrite blocks being in the plane of said stripline members.

12. The apparatus of claim 3 with said R-F signal carrying members each comprising a waveguide, said waveguides being coplanar and connected at a common center, said ferrite means being located centrally and interiorly of said waveguide, the hole formation in said ferrite means being in a plane parallel to the plane of said waveguides.

13. The apparatus of claim 3 with said signal carrying members being substantially coplanar and joined together at a common center, said ferrite means comprising portions aligned on radii from said common center, said radii being between and substantially bisecting the angles between said signal carrying members.

14. The apparatus of claim 11 with the connection of said striplines at said common center having an opening therein to improve coupling between the fields of said ferrite means and said striplines.

15. The apparatus of claim 11 with holes being in said striplines to receive the conductor means for carrying the direct current magnetizing pulse.

16. The apparatus of claim 12 with said ferrite means comprising a separate block of ferrite material for each of said waveguides, and said blocks being positionally aligned with each of said waveguides.

17. The apparatus of claim 12 with said ferrite means having a number of legs corresponding to the number of waveguides, and said legs being aligned with the intersection of the walls of said waveguides.

18. The apparatus of claim 13 with said ferrite means comprising six separate blocks, three of said blocks being on one side of said signal carrying members and three of said blocks being on the other side of said signal carrying members,
each of said blocks having a hole formation therein with the axis of each hole being substantially perpendicular to the radius of the corresponding block and said axes being in planes substantially parallel to the plane of said signal carrying members.

19. Apparatus comprising
at least three R-F signal carrying members each having an external field associated therewith,
ferrite means having a high remnant magnetization capable of being magnetized in either of two states and being in the external field of each of said signal carrying members,
ground plane means being positioned externally of said ferrite means,
said ferrite means capable of one state of magnetization producing interacting field lines which interact with said external fields of said signal carrying members so that each signal carrying member passes its signal only to a first signal carrying member and receives only the signal being carried by a second signal carrying member,
said ferrite means capable of another state of magnetization for producing oppositely directed interacting field lines so that said each signal carrying member passes its signal only to said second signal carrying member and receives only the signal being carried by said first signal carrying member,
said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means,
said R-F signal carrying members entering the area of said ferrite means in a common plane,
said ferrite means having a plurality of holes in said common plane,
conductor means being in each of said holes in said common plane for receiving a D.C. pulse in one direction to latch said ferrite means in one of said states and adapted to receive a D.C. pulse in the other direction to latch said ferrite means in another of said states.

20. Apparatus comprising
at least three R-F signal carrying members each having an external field associated therewith,
ferrite means having a high remnant magnetization capable of being magnetized in either of two states and being in the external field of each of said signal carrying members,
ground plane means being positioned externally of said ferrite means,
said ferrite means capable of one state of magnetization producing interacting field lines which interact with said external fields of said signal carrying members so that each signal carrying member passes its signal only to a first signal carrying member and receives only the signal being carried by a second signal carrying member,
said ferrite means capable of another state of magnetization for producing oppositely directed interacting field lines so that said each signal carrying member passes its signal only to said second signal carrying member and receives only the signal being carried by said first signal carrying member,
said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means,
said ferrite means being generally toroidal in shape and having a hole in its center,
conductor means for carrying a magnetizing D.C. current wound in a helix around the walls of said ferrite means and through the hole in the center of said ferrite means.

21. Apparatus comprising
at least three R-F signal carrying members each having an external field associated therewith,
ferrite means having a high remnant magnetization capable of being magnetized in either of two states and being in the external field of each of said signal carrying members,
ground plane means being positioned externally of said ferrite means,
said ferrite means capable of one state of magnetization producing interacting field lines which interact with said external fields of said signal carrying members so that each signal carrying member passes its signal only to a first signal carrying member and receives only the signal being carried by a second signal carrying member,
said ferrite means capable of another state of magnetization for producing oppositely directed interacting field lines so that said each signal carrying member passes its signal only to said second signal carrying member and receives only the signal being carried by said first signal carrying member,
said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means,
said R-F signal carrying members each comprising a stripline,
said striplines being coplanar and directed toward a common center,
said ferrite means being of a toroid of ferrite material having an opening concentric with said common center,
conductor means being spirally wrapped around said toroid of ferrite material through said opening and connected to each of said striplines,
connecting means connecting each of said striplines to said conductor means for providing conduction of R-F energy but preventing conduction of D.C. current,
one of said connecting means having an input and output for connection to a D.C. current source so that a D.C. current path is provided through said conductor means to magnetize said ferrite material.

22. Apparatus comprising at least three R-F signal carrying members each having an external field associated therewith, ferrite means having a high remnant magnetization capable of being magnetized in either of two states and being in the external field of each of said signal carrying members, ground plane means being positioned externally of said ferrite means, said ferrite means capable of one state of magnetization producing interacting field lines which interact with said external fields of said signal carrying members so that each signal carrying member passes its signal only to a first signal carrying member and receives only the signal being carried by a second signal carrying member, said ferrite means capable of another state of magnetization for producing oppositely directed interacting field lines so that said each signal carrying member passes its signal only to said second signal carrying member and receives only the signal being carried by said first signal carrying member, said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means, said R-F signal carrying members each comprising a round conductor arm, said arms being coplanar and directed toward a common center, central conducting means being at the common center of said arms, said central conducting means being embedded in said ferrite means in the region of said common center, connecting means connecting each of said arms to said central conductor means for providing conduction of R-F energy but preventing conduction of D.C. current, connecting means between one of said arms and said central conductor means having an input and output for connection to a D.C. current source so that a D.C. current path is provided through said conductor means to magnetize said ferrite material.

23. Apparatus comprising at least three R-F signal carrying members each having an external field associated therewith, ferrite means having a high remnant magnetization capable of being magnetized in either of two states and being in the external field of each of said signal carrying members, ground plane means being positioned externally of said ferrite means, said ferrite means capable of one state of magnetization producing interacting field lines which interact with said external fields of said signal carrying members so that each signal carrying member passes its signal only to a first signal carrying member and receives only the signal being carried by a second signal carrying member, said ferrite means capable of another state of magnetization for producing oppositely directed interacting field lines so that said each signal carrying member passes its signal only to said second signal carrying member and receives only the signal being carried by said first signal carrying member, said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means, said R-F signal carrying members each comprising a coaxial cable, said cables being coplanar and directed toward a common center, said ferrite means being a toroid having a central opening of ferrite material concentric with said common center, said conductor means being spirally wrapped around said toroid of ferrite means and through said opening and connected to each of said cables, connecting means connecting each of said cables to said conductor means for providing conduction of R-F energy but preventing conduction of D.C. current, one of said connecting means having an input and output for connection to a D.C. current source so that a D.C. current path is provided through said conductor means to magnetize said ferrite means.

24. Apparatus comprising at least three R-F signal carrying members each having an external field associated therewith, ferrite means having a high remnant magnetization capable of being magnetized in either of two states and being in the external field of each of said signal carrying members, ground plane means being positioned externally of said ferrite means, said ferrite means capable of one state of magnetization producing interacting field lines which interact with said external fields of said signal carrying members to that each signal carrying member passes its signal only to a first signal carrying member and receives only the signal being carried by a second signal carrying member, said ferrite means capable of another state of magnetization for producing oppositely directed interacting field lines so that said each signal carrying member passes its signal only to said second signal carrying member and receives only the signal being carried by said first signal carrying member, said ferrite means having a hole formation therein which is adapted to receive conductor means carrying a direct current pulse in one direction to generate a magnetic field in one direction directly within said ferrite means and latch said ferrite means in one of said states of magnetization and a direct current pulse in the opposite direction to generate a magnetic field in the opposite direction to said one direction in said ferrite means and latch said ferrite means in the second state of magnetization, so that the magnetic fields in said one direction and said opposite direction have unbroken paths thereby eliminating any air gaps in the magnetic paths and eddy currents in said ground plane means, said ferrite means having a plurality of holes, conductor means being in each of said holes in said ferrite means for receiving a D.C. pulse in one direction to latch said ferrite means in one of said states and for receiving a D.C. pulse in the other direction to latch said ferrite means in another of said states.

means to apply a D.C. pulse in said one direction and said other direction to said conductor means.

25. Apparatus comprising at least three R-F signal carrying members each generating an electromagnetic field in the space adjacent thereto when a signal is flowing therein, ferrite means being in the electromagnetic field of each of said signal carrying members, ground plane means being positioned externally of said ferrite means and said R-F signal carrying members, said ferrite means capable of a state of magnetization producing interacting field lines which interact with said fields of said signal carrying members so that each signal carrying member passes its signal only to a first signal carrying member and receives only the signal being carried by a second signal carrying member, said ferrite means having a hole formation therein for receiving conductor means carrying a direct current pulse for generating a magnetic field directly within said ferrite means to latch said ferrite means in a state of magnetization whereby said magnetic field has an unbroken path thereby eliminating air gaps in the magnetic path and eddy currents in said ground plane means, said R-F signal carrying members each comprising a stripline, a stripline segment having a port connected to every signal carrying member and providing electrical communication between said signal carrying members, said signal carrying members being coplanar and directed toward a common center and each signal carrying member being connected to adjacent members by said stripline segment, said ferrite means being positioned adjacent said common center of said stripline segment, said hole formation in said ferrite means for receiving said conductor means being a plane parallel to said signal carrying members.

References Cited

UNITED STATES PATENTS

| | | | |
|---|---|---|---|
| 3,051,917 | 8/1962 | Gyorgy et al. | 333—31 |
| 3,079,570 | 2/1963 | Hickey | 333—1.1 |
| 3,165,711 | 1/1965 | Drumheller et al. | 333—1.1 |

OTHER REFERENCES

Proc. of the IRE, August 1958, Treuhaft et al., p. 1538.

Proc. of the IRE, August 1960, Grace et al., pp. 1497, 1498.

HERMAN KARL SAALBACH, *Primary Examiner.*

P. L. GENSLER, *Assistant Examiner.*